United States Patent Office 3,743,745
Patented July 3, 1973

3,743,745
NITRO-TRIFLUOROMETHYL-BENZANILIDES
FOR TREATING COCCIDIOSIS
Dean Earl Welch and Robert Richard Baron, Charles
City, Iowa, assignors to Salsbury Laboratories
No Drawing. Original application Nov. 18, 1968, Ser. No.
776,752, now Patent No. 3,689,556. Divided and this
application May 18, 1972, Ser. No. 254,805
Int. Cl. A61k 27/00
U.S. Cl. 424—324                5 Claims

ABSTRACT OF THE DISCLOSURE 5-nitro-3,3'-trifluoromethylbenzamides of the general configuration

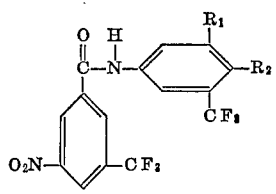

in which $R_1$ is H or $CF_3$ and $R_2$ is H or $NO_2$ and veterinary compositions for the treatment of avian coccidiosis containing the same. The compounds 4',5-dinitro-3,3'-(bis)-trifluoromethylbenzanilide and 5-nitro-3,3',5'-(tris)-trifluoromethylbenzanilide are disclosed as illustrative examples.

---

This is a division of application Ser. No. 776,752, filed Nov. 18, 1966, now U.S. Patent 3,689,556.

This invention relates to new chemical compounds in the series of benzanilides in which the two nuclear rings are modified by the introduction of nitro ($-NO_2$) and trifluoromethyl ($-CF_3$) substituents. More particularly, the compounds may be characterized by the following general configuration:

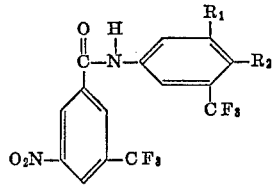

in which $R_1$ and $R_2$ may be identical or different, and $R_1$ represents hydrogen or $CF_3$ and $R_2$ stands for hydrogen or $NO_2$. Illustrative and preferred embodiments of our invention are 4',5-dinitro-3,3'-(bis)-trifluoromethylbenzanilide of the formula

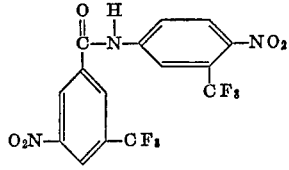

and 5-nitro-3,3',5'-(tris)-trifluoromethylbenzanilide of the formula

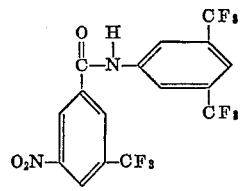

The compounds of our invention may be readily prepared by converting 3-trifluoromethyl-5-nitrobenzoic acid with thionyl chloride into its benzoyl chloride and reacting the same with the desired fluoromethylaniline in accordance with the following equation:

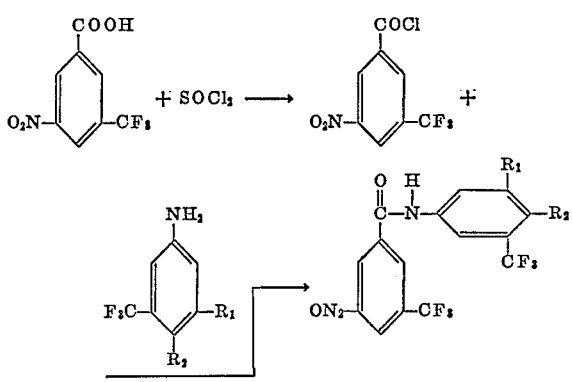

The synthesis of 3-trifluoromethyl-5-nitrobenzoic acid is described by Hauptschein in J. Am. Chem. Soc., 76, 1051 (1954). The fluoromethylanilines are known intermediates and commercially available from producers of organic chemicals. They may be prepared as described by Jones in J. Am. Chem. Soc., 69, 2346 (1947) and Ross in J. Am. Chem. Soc., 75, 4967 (1953).

Our invention will be illustrated by the following examples:

EXAMPLE 1

4',5-dinitro-3,3'-(bis)-trifluoromethylbenzanilide

The formation of this compound proceeds in accordance with the following equation:

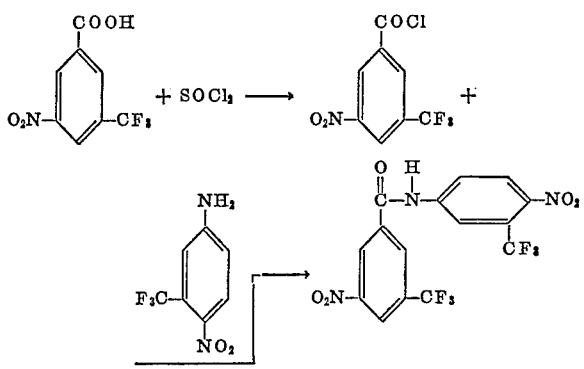

A mixture of 40 gms. (0.169 mol) of 3-trifluoromethyl-5-nitrobenzoic acid and 200 ml. of thionyl chloride was heated at reflux for 4½ hours. The halogenating agent was thereupon removed under vacuum and the residue was added to a solution of 35 gms. (0.169 mol) of 3-trifluoromethyl-4-nitroaniline in 150 ml. of pyridine at a temperature below 25° C. The resulting solution was poured into 1 liter of water and yielded a precipitate which was removed by filtration. After recrystallization from aqueous alcohol about 47 gms. (equal to 65% of the theory) was harvested in form of yellow crystals. The compound has a melting point of 177–178° C. and is soluble in most highly polar organic solvents. The substance on analysis was found to contain:

Carbon _____ 41.96% (calculated value 42.57).
Hydrogen _____ 1.58% (calculated value 1.67).
Nitrogen _____ 9.58% (calculated value 9.93).

EXAMPLE 2

5-nitro-3',3',5'-(tris)-trifluoromethylbenzanilide

The intermediate 3-trifluoromethyl-5-nitrobenzoyl chloride was prepared in accordance with Example 1 and the following equation illustrates the overall reaction:

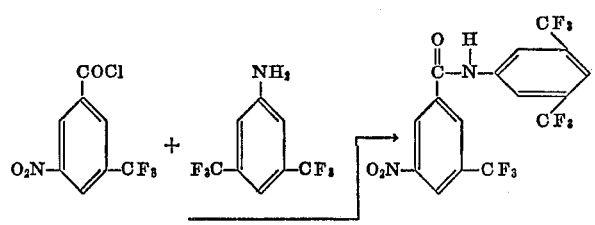

Thirty-nine grams (0.169 mol) of 3,5-(bis)-trifluoromethylaniline were dissolved in 150 ml. of pyridine and treated with the benzoyl chloride intermediate of Example 1 at a temperature below 25° C. The mixture was poured into 1 liter of water and the resulting precipitate was filtered and recrystallized as a white solid from aqueous alcohol. The yield was 60 gms. (equal to 80% of the theory) with a melting point of 216-217° C. The compound is soluble in most highly polar organic solvents.

Upon analysis the substance was found to contain:

Carbon _____ 43.13% (calculated value 43.06%).
Hydrogen _____ 1.56% (calculated value 1.58%).
Nitrogen _____ 6.25% (calculated value 6.28%).

The compounds of our invention are useful in the prevention and control of poultry coccidiosis which is induced by a number of protozoal organisms. The most prevalent and injurious species responsible for the epizootic are *Eimeria tenella, Eimeria necatrix, Eimeria acervulina,* and *Eimeria brunetti,* which differ in degree of virulence and may cause a variety of clinical symptoms, from a lingering state of morbidity, unthriftiness, and marasmus to a ruinous decimation of entire flocks by a substantial death toll.

In accordance with another aspect of our invention therefore, we provide veterinary compositions containing the above-identified chemicals as active ingredients for the control of avian coccidiosis. The drugs are advantageously employed by introducing the same into the animal organism in any form or manner in which they are capable of building up and maintaining an effective blood and tissue level. This can be accomplished either by injection or by dispensation of suitable nontoxic dosages in capsules or tablets. However, as a preferred embodiment, we use as a carrier material, a liquid or solid food such as a drinking water solution or suspension, or any commercial feed ration of the starting, growing, or laying type which will supply the basic nutritional requirements of the birds. The so-medicated rations are placed before the birds for consumption ad libitum.

The minimum dosages in the feed run from 0.00625% to 0.1% depending upon the parasite to be checked, the gravity of the outbreak, and the specific drug employed. The preferred ranges for 4',5-dinitro-3,3'-(bis)-trifluoromethylbenzanilide are from 0.025–0.05% and for 5-nitro-3,3',5' - (tris)-trifluoromethylbenzanilide from 0.0125–0.05%. The following tables will illustrate the utility of our new compounds.

For each experiment, prefectly healthy 4½-week-old Leghorn chickens, in groups of 4, were reared in an aseptic environment and prepared for test fitness. Each bird was weighed starting on the first and continuing to the last day of the experiment. In order to determine the efficacy of the drug, each of the birds was placed on medicated food at least two days before artifical inoculation and successively maintained thereon for 8 to 13 days. For artificial challenges, the birds received, respectively, 5-10,000,000 oocysts of *Eimeria acervulina,* 200,000 oocysts of *Eimeria brunetti,* and 100,000 oocysts of *Eimeria necatrix* and *Eimeria tenella.* A reference group of 4 birds was infected but left without medication and served as controls. A third group of 4 birds was neither challenged nor treated with medicated rations. The activity of the drugs was evaluated in terms of compartive fecal scores and morbidity factors, and in the case of *Eimeria tenella* and *Eimeria necatrix* of mortality rates.

By way of explanation, the two colums following the test number record the specific parasite against which the compound was tested and the dosage level in the feed employed. The tests in which no feed concentration is given apply to infected, untreated controls and serve as basis of comparison. The fecal scores are expressed in percentage and computed in the following manner. Beginning on the fourth day after experimental inoculation and every day thereafter until the conclusion of the experiment, the droppings of each bird were carefully examined and their deviations from the normal appearance were graded in accordance with accepted practices as "fecal scores," which were computed in the following manner. In the case of *Eimeria tenella* the amount of hemorrhage in the droppings collected in metal pans beneath the birds were rated and recorded in terms of:

0—hemorrhage
B—slight hemorrhage
BB—moderate hemorrhage
BBB—severe hemorrhage
BBBB—very severe hemorrhage Upon the conclusion of the test, the maximum hemorrhage rating for each bird, irrespective of the day of its occurrence, was recorded. All the maximum rating for the medicated, infected groups were totaled and compared with the total of the maximum ratings of the nonmedicated, infected controls. If the artificial infections had taken effective hold, each of the 4 infected and nonmedicated "birds" would show a full rating of 4 B's during at least one day of the test period so that the maximum total rating for that group would usually amount to 16 B's. Supposing the highest ratings for 4 infected and medicated birds in a given group are, respectively, 0, BB, B and B, the total rating for the entire group would be 4 B's. The difference between the B-totals divided by the maximum rating established for the infected, nonmedicated controls times 100 represents the "fecal scores"; thus, 16—4=12;

$$\frac{12}{16} \times 100 = 75\%$$

A fecal score of 75%, therefore, means that the droppings were 75% normal.

Similarly the fecal scores for the species causing no appreciable hemorrhage, but other characteristic clinical deviations in the droppings, are computed on the basis of their magnitude in terms of the following ratings:

0—droppings normal
+—droppings slightly normal
++—droppings about half normal
+++—droppings about one-quarter normal
++++—droppings completely abnormal The mortality column in the table records first the actual number of birds out of 4 which succumbed to the infection and the corresponding death toll in percentages.

MF stands for Morbidity Factor. This criterium expresses the comparative values between the mean weight gains of noninfected, nonmedicated birds and those of the infected nonmedicated birds, or, respectively, the infected, medicated test animals. During the 5th to 7th day the coccidial infection usually causes the maximum inhibition of growth which reflects itself in the ultimately weight gains or losses at the conclusion of the test periods. Assuming the mean weight gain to uninfected, nonmedicated birds is 200 gms., equal to 100%, and that of the infected, nonmedicated controls is 28.6 gms., the morbidity factor would be $$\frac{28.6}{200} \times 100 = 14.3\%$$

which indicates that due to the infection the growth rate has reached a level of only 14.3%, or, conversely, has dropped by 100—14.3%=95.7% from the normal. This figure is listed in the succeeding column titled GRD (Growth Rate Drop). If, on the other hand, the morbidity factor of the infected, medicated group is 64.8%, the corresponding GRD would be only 35.2%. The difference between the two morbidity factors, or 85.7—35.2%= 50.5%, signifies that as a result of the medication a growth rate increase of 50.5% was achieved over the infected, nonmedicated controls, or that the stunting effects of the infection was compensated by the drug to the extent of 50.5%. This figure appears in the last column are compensating effect, or CE. In some of the tests, as for example *Eimeria tenella*, no comparative morbidity factors and compensating effects could be established because the infected animals died before they could be weighted. This also occurred occasionally at the toxicity threshold of the maximum dosage level of 0.1% in relation to the medication period, but it still permitted a valid determination of the potency of the drug in terms of fecal scores. In most of the tests, however, the tables show that in addition to an improvement of the droppings our new compounds have a remarkable sustaining effect on the growth of the infected animals.

TABLE I
(4,5'-dinitro-3,3'-(bis) trifluoromethylbenzanilide)

| Test number | Parasite | Feed, conc., percent | Fecal score, percent | Mortality Number | Mortality Percent | Percent MF | Percent GRD | Percent CE |
|---|---|---|---|---|---|---|---|---|
| 1 | E. tenella | | 0 | 1 | 25 | | | |
| 2 | E. tenella | 0.0500 | 0 | 0 | 0 | | | |
| 3 | E. necatrix | | 0 | 3 | 75 | 4.2 | 104.2 | |
| 4 | E. necatrix | 0.0500 | 30 | 0 | 0 | 42.7 | 57.3 | 46.9 |
| 5 | E. necatrix | | 0 | 0 | 0 | 57.7 | 42.3 | |
| 6 | E. necatrix | 0.0500 | 100 | 0 | 0 | 71.0 | 29.0 | 13.3 |
| 7 | E. acervulina | | 0 | 0 | 0 | 38.2 | 61.8 | |
| 8 | E. acervulina | 0.0500 | 90 | 0 | 0 | 75.1 | 24.9 | 36.9 |
| 9 | E. acervulina | | 0 | 0 | 0 | 14.3 | 85.7 | |
| 10 | E. acervulina | 0.0250 | 65 | 0 | 0 | 64.8 | 35.2 | 50.5 |
| 11 | E. acervulina | 0.0500 | 100 | 0 | 0 | 88.5 | 11.5 | 74.2 |
| 12 | E. acervulina | 0.1000 | 100 | 0 | 0 | 81.0 | 19.0 | 66.7 |
| 13 | E. acervulina | | 0 | 0 | 0 | 33.4 | 66.6 | |
| 14 | E. acervulina | 0.0500 | 100 | 0 | 0 | 75.9 | 24.1 | 42.5 |
| 15 | E. brunetti | | 0 | 0 | 0 | 24.1 | 75.9 | |
| 16 | E. brunetti | 0.0500 | 74 | 0 | 0 | 73.0 | 27.0 | 48.9 |

TABLE II
(5'-nitro-3,5,3'-(tris)-trifluoromethylbenzanilide)

| Test number | Parasite | Feed conc., percent | Fecal score, percent | Mortality Number dead | Mortality Percent | Percent MF | Percent GRD | Percent CE |
|---|---|---|---|---|---|---|---|---|
| 1 | E. tenella | | 0 | 1 | 25 | 31.2 | 68.8 | |
| 2 | E. tenella | 0.0125 | 0 | 0 | 0 | 48.5 | 51.5 | 17.3 |
| 3 | E. tenella | 0.0250 | 25 | 1 | 25 | 90.5 | 9.5 | 59.3 |
| 4 | E. tenella | 0.0500 | 90 | 0 | 0 | 52.1 | 47.9 | 20.9 |
| 5 | E. tenella | 0.1000 | 100 | 0 | 0 | | | |
| 6 | E. necatrix | | 0 | 4 | 100 | | | |
| 7 | E. necatrix | 0.0500 | 100 | 0 | 0 | 81.8 | 18.2 | |
| 8 | E. necatrix | | 0 | 3 | 75 | 33.2 | 66.8 | |
| 9 | E. necatrix | 0.0250 | 100 | 0 | 0 | 86.7 | 13.3 | 53.5 |
| 10 | E. necatrix | 0.1000 | 100 | 0 | 0 | | | |
| 11 | E. acervulina | | 0 | 0 | 0 | 12.9 | 87.1 | |
| 12 | E. acervulina | 0.0500 | 100 | 0 | 0 | 53.2 | 46.8 | 40.3 |
| 13 | E. acervulina | | 0 | 0 | 0 | 33.0 | 67.0 | |
| 14 | E. acervulina | 0.00625 | 5 | 0 | 0 | 43.2 | 56.8 | 10.2 |
| 15 | E. acervulina | 0.01250 | 30 | 0 | 0 | 58.6 | 41.4 | 25.6 |
| 16 | E. acervulina | 0.0250 | 100 | 0 | 0 | 83.3 | 16.7 | 50.3 |
| 17 | E. acervulina | 0.0500 | 100 | 0 | 0 | | | |
| 18 | E. acervulina | 0.1000 | 100 | 0 | 0 | | | |
| 19 | E. brunetti | | 0 | 0 | 0 | 28.7 | 71.3 | |
| 20 | E. brunetti | 0.0500 | 100 | 0 | 0 | 93.3 | 6.7 | 64.6 |
| 21 | E. brunetti | | 0 | 0 | 0 | 18.4 | 81.6 | |
| 22 | E. brunetti | 0.00625 | 25 | 0 | 0 | 37.6 | 62.4 | 19.2 |
| 23 | E. brunetti | 0.01250 | 90 | 0 | 0 | 61.0 | 39.0 | 42.6 |
| 24 | E. brunetti | 0.02500 | 100 | 0 | 0 | 90.7 | 9.3 | 72.3 |
| 25 | E. brunetti | 0.0500 | 100 | 0 | 0 | | | |
| 26 | E. brunetti | 0.1000 | 100 | 0 | 0 | | | |

What we claim is:

1. A veterinary composition for the control of avian coccidiosis comprising an orally ingestible nontoxic carrier and as an active ingredient dispersed therein an effective, but nontoxic, amount of a nitrotrifluoromethylbenzanilide of the formula

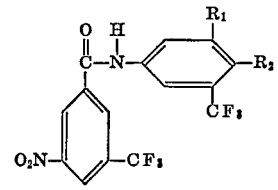

wherein $R_1$ represents H or $CF_3$, and $R_2$ represents H or $NO_2$.

2. A veterinary composition for the control of avian coccidiosis in accordance with claim 1 in which the ingestible nontoxic carrier is a solid or liquid food material.

3. A veterinary composition for the control of avian coccidiosis in accordance with claim 2 in which the amount of the nontoxic active ingredient is within the range of 0.00625 to 0.1% by weight of the composition.

4. A veterinary composition in accordance with claim 2 wherein the active ingredient is 5,4'-dinitro-2,3'-(bis)-trifluoromethylbenzanilide in an amount of from 0.025 to 0.1% by weight of the composition.

5. A veterinary composition in accordance with claim 3 wherein the active ingredient is 5-nitro-3,3'-5'-(tris)-trifluoromethylbenzanilide.

References Cited

Chem. Abst. Seventh Collective Index, vol. 56–65 (1962–1966), pages 5946S and 5947S.

SAM ROSEN, Primary Examiner